(12) United States Patent
Cue et al.

(10) Patent No.: US 6,289,222 B1
(45) Date of Patent: Sep. 11, 2001

(54) FREE-FORMING ONE-WAY NETWORK

(75) Inventors: Nelson Cue; Che Kin Lee; Wing Yim Tam, all of Clear Water Bay (HK)

(73) Assignee: The Hong Kong University of Science & Technology, Hong Kong (HK)

( * ) Notice: Subject to any disclaimer, the term of this patent is extended or adjusted under 35 U.S.C. 154(b) by 0 days.

(21) Appl. No.: 08/895,043

(22) Filed: Jul. 16, 1997

(51) Int. Cl.$^7$ .................................................. H04Q 7/20
(52) U.S. Cl. .............................. 455/458; 455/2; 455/500; 455/508; 455/466; 434/336; 434/350; 434/351
(58) Field of Search ........................... 455/2, 415, 426, 455/458, 466, 500; 370/312, 413, 349; 434/319, 334, 336, 350, 351, 362

(56) References Cited

U.S. PATENT DOCUMENTS

| | | | |
|---|---|---|---|
| 3,416,243 | * | 12/1968 | Greenberg et al. . |
| 3,676,939 | * | 7/1972 | Oberst et al. . |
| 3,762,072 | * | 10/1973 | From . |
| 3,784,979 | * | 1/1974 | Friedman et al. ............... 340/146.2 |
| 4,764,120 | * | 8/1988 | Griffin et al. .................... 434/336 |
| 5,093,786 | | 3/1992 | Derks ............................. 395/800 |
| 5,227,874 | * | 7/1993 | Von Kohorn ...................... 358/84 |
| 5,273,437 | * | 12/1993 | Caldwell et al. ................. 434/351 |
| 5,453,015 | * | 9/1995 | Vogel ............................. 434/350 |
| 5,465,286 | * | 11/1995 | Clare et al. ...................... 379/34 |
| 5,558,638 | * | 9/1996 | Evers et al. ...................... 604/67 |
| 5,724,357 | * | 3/1998 | Derks ............................. 370/413 |
| 5,907,604 | * | 5/1999 | Hsu ............................... 379/142 |

FOREIGN PATENT DOCUMENTS 2650901  2/1991 (FR) ................... G06F/3/02

OTHER PUBLICATIONS

Huber, J. et al, "Simple Asynchronous Multiplex System for Unidirectional Low-Data-Rate Transmission", IEEE Transactions on Communications, U.S. IEEE, Inc. New York, vol. 23, No.6, Jan. 1, 1975, pp. 675–679.

* cited by examiner

Primary Examiner—Stella Woo
Assistant Examiner—Binh K. Tieu
(74) Attorney, Agent, or Firm—Burns, Doane, Swecker & Mathis, L.L.P.

(57) ABSTRACT

A one-way or single-channel communication network utilizing electromagnetic radiation signals of a fixed single or narrow-band frequency in free air space consists of a plurality of transmitters and a central receiver in which each message is encoded in a wave train and is tagged with a sender identity (ID). The central receiver, which can be a single unit or a plurality of units connected in cascade, detects the messages in the free air space and send them along to a central processing unit (CPU) for message handling. Possible additional features of the system are: an option of a small display panel on the individual transmitter to show the message to be sent plus the number of attempts a message was sent within a preset time; a separate feedback segment, such as a colour change of a characteristic symbol on a central display screen visible to the sender, providing a confirmation that the message has been received; each symbol on the display screen showing the number of times a message was received from the corresponding transmitter within a present time; and a built-in option to either retain or black out the ID tag on the messages to be processed by the CPU. The free forming aspect of the system stems from the portability of the ID-encoded transmitters which enables any combination of transmitters to form a communication network, and a plurality of such combinations to form a plurality of networks.

30 Claims, 3 Drawing Sheets

FREE-FORMING ONE-WAY NETWORK

FIELD OF THE INVENTION

The present invention relates to a one-way or single channel communication network that utilizes electromagnetic radiation in free air space. Such a one-way network is useful for recording group responses to a prompt such as an action, a question, or a stimulus; particularly in those gatherings that require the completion of the registration of all responses in a time span of the order of minutes.

1. Background of the Invention

Many communication network systems have been proposed previously. Most are not wireless and such wired systems would be more expensive to implement because of the costs associated with the purchase and installation of the electrical wires or optical fibre cables. Also, they are extremely difficult to transport to and use in another location. Those systems that are wireless also have disadvantages or limitations. For example, a system described in U.S. Pat. No. 5,566,022 uses infrared (IR) transmission in free air space, but it is not a single-channel system since it entails back and forth or multi-channel communications among the units attached to the network. A multichannel system would be costlier than a single-channel one because each transmitter must also be a receiver. There are also the complications resulting from the need to keep track of the status of all transceivers.

2. Prior Art

Another wireless, described in U.S. Pat. No. 4,377,870, uses a one-way radio-frequency (RF) transmission but the message transmitted is not at a single frequency, not a coded signal, and not tagged with a senders ID. A system employing multi-frequency transmission will cost more than one that uses one frequency. Also, without an ID tagged on the signal the systems utility is limited to that of polling function. One other wireless system is the infrared remote controller used in consumer electronics products and in opening and locking car doors. It is a single channel communication, but it is not a network because there is only the combination of one transmitter and one receiver.

SUMMARY OF THE INVENTION

An object of the present invention is to provide a free-forming one-way network (FON) of a simple design leading to low production costs, ease of use, and portability. A free-forming one-way network is a single-channel communication network system in which the messages transmitted by the network participants flow only to a central receiver and the network can be comprised of any combination of participants.

According to the present invention therefore there is provided a free-forming one-way network, comprising a plurality of wireless transmitters for the network participants, each said transmitter being adapted to transmit a short message, in the form of a short burst of coded radiation signals at a single or narrow-band frequency in free open air, in response to a prompt such as an action, a question or a stimulus;

a central wireless receiver for detecting the messages sent by the transmitters;

means for decoding and digitizing these messages;

central processing means for receiving, storing and analysing the decoded and digitized messages; and means for acknowledging to the sender the receipt of the message he or she sent.

In this way, there is provided a one-way or single-channel communication network utilizing electromagnetic radiation signals of a fixed single or narrow-band frequency in free air space, and comprising of a plurality of transmitters and a central receiver in which each message is encoded in a wave train. In a preferred arrangement each signal may be tagged with a sender identity (ID). The central receiver, which can be a single unit or a plurality of units connected in cascade, detects the messages in the free air space and sends them along to a central processing unit (CPU) for message handling.

In a preferred embodiment there may be provided a small display panel on the individual transmitter to show the message to be sent plus the number of attempts to send a message within a preset time. The system may include a central display panel, and the acknowledging means may comprise a change (for example of a colour) of a characteristic symbol on a central display screen visible to the sender providing a confirmation that the message has been received, and each symbol on the display screen may show the number of times a message was received from the corresponding transmitter within a present time.

Even where the transmitters include an ID tag, the CPU means may be provided with an option to ignore that tag or to retain it, depending on the intended application of the system (eg education or mere polling).

The free forming aspect of the system stems from the portability of the ID-encoded transmitters which enable any combination of transmitters to form a communication network, and a plurality of combinations to form a plurality of networks.

A plurality of transmitters (Ts) and receiver (R) comprise the hardware of the FON. Each T has an integrated circuit (IC) and a radiation emitter which are housed inside a pocket-size casing. The memory bank of the IC chip stores the user ID number and a simple message. The message is written on the Ts memory when the user presses on of the buttons on the keypad of the T, and the tagged message is transmitted to the free air space as a sort burst of radiation wave train. If desired, the T can be equipped with a display panel to show the message to be sent and the number of attempts a message was sent. The R consists of similar ICs but with a radiation detector instead of a radiation emitter. It receives the tagged messages transmitted by the plurality of Ts, decodes these in the order received, and sends along the digitized form of the messages to the CPU for analysis and storage. An important preferred feature of the FON is the feedback signal acknowledging to the particular sender that the message has been received, and this could be as simple as a change in the colour of the corresponding labelled block on a central display screen. An added confirmation is to display along with the labelled block the number of times a message has been received since the sender can attempt to send a message more than once.

The reception, analysis and storage of messages detected by the R are handled by the FON software. Before the start of each session, an option is exercised on whether or not the ID tagged to each message will be processed by the CPU. When a session is started, a file name for that session is entered and a data file in the CPU is created. For each round of responses to be solicited in the session, a timer is turned on and a graphic display of the plurality of the Ts as appropriately labelled boxes is projected onto a display screen for all to see. Every message received is stored in the data file. After the preset time has elapsed, all responses are analysed and the summarily results projected for all to see. The cycle is repeated for the next round until the end of the session, at which time an end-of-file is marked on the data file, and the entire file is written onto a data storage device like a hard disk for future retrieval.

The utility of the FON is simplest to envision in an instructional session for job training or education. When the instructor asks a question, generally only a few in the audience would raise their hands in order to be called to respond. Many would not participate actively for fear of being embarrassed. With the use of the FON, all in the audience are equipped with a T and, thus, all can answer in private without any risk of embarrassment Since most instructional questions can be cast in the form of multiple choice, the message can be as simple as a one-digit number tagged with the corresponding ID. This ID can be the unit number of the T, seat number, social security number, or student ID number. The unique free-forming feature of the FON is manifested when personalized IDs are used. For example, in an educational institution like a university, college, or high school, each on of the entire student body can be provided with their own personal pocket-size T which they can bring along and use in any of the classes they attend. In the campus-wide situation, a plurality of Ts corresponds to the entire student body and a plurality of Rs corresponds to at least the number of classrooms. A campus-wide FON is clearly a general learning tool as oppose to a general teaching tool like an overhead projector. The FON wold facilitate the use of active learning strategies in every class on campus, and also record class attendance automatically.

BRIEF DESCRIPTION OF THE DRAWINGS

An embodiment of the invention will now be described by way of example and with reference to the accompanying drawings, in which.

DETAILED DESCRIPTION OF THE PREFERRED EMBODIMENT

Figure 1:
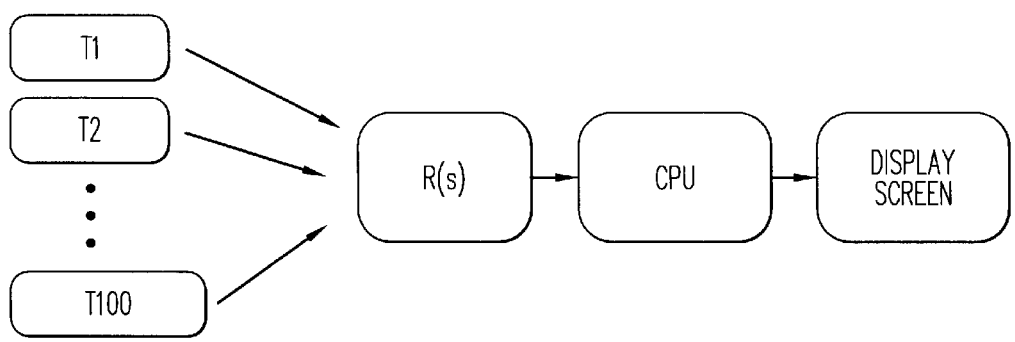
FIG. 1 schematically shows the components comprising the FON and their connections, FIG. 2 schematically illustrates the use of microchip for user identification, FIG. 3 schematically illustrates the basic components of a receiver.
Figure 2:
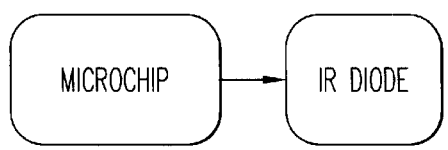

Referring firstly to FIG. 1 the simplest embodiment of the transmitter (T) is a hand-held battery-operated device that emits a beam of characteristic infrared (IR) signals in short pulses when any of the ten-digit buttons is depressed. This T could be a commercial IR remote controller for a television set in which the electronic circuit has been modified by the addition of a circuit to disable the continuous transmission feature. In this case the signal is tagged by a 3-digit ID number. More than one respondent can share one T. For example, two can share if the multiple choice is restricted to five (5) selections by designating digits 1, 2, 3, 4, and 5 to one respondent and digits 6, 7, 8, 9, and 0 to the other. For the campus-wide version of the FON, a specially designed microchip is required with the preferred embodiment shown in FIG. 2. This design enables the transmission of an IR wave train signal that is encoded with the student ID of any number of digits plus his/her selection. The design also allows the student ID to be entered or changed only by first keying in a password. It is also desirable to equip each T with a display panel to show the message to be sent and the number of attempts a message was sent in a given prompt.

Figure 3:

The simplest embodiment of the receiver (R) is a suitably modified commercial unit used in the IR remote control system for consumer electronics. FIG. 3 shows a block diagram of R which consists of an IR detector (a diode sensor coupled to a pre-amplifier), a micro-controller and an RS-232C Driver. A signal from on of the Ts which is detected by the IR detector is decoded, digitized, and sent to a CPU or PC (or PC notebook) for data logging and analysis via the RS-232C serial port. This R is powered by the PC and can receive signals emitted from a distance of up to about 20 m and arriving within a cone angle of about 60°. Two or more Rs can be connected in cascade to cover a larger area.

Figure 4:
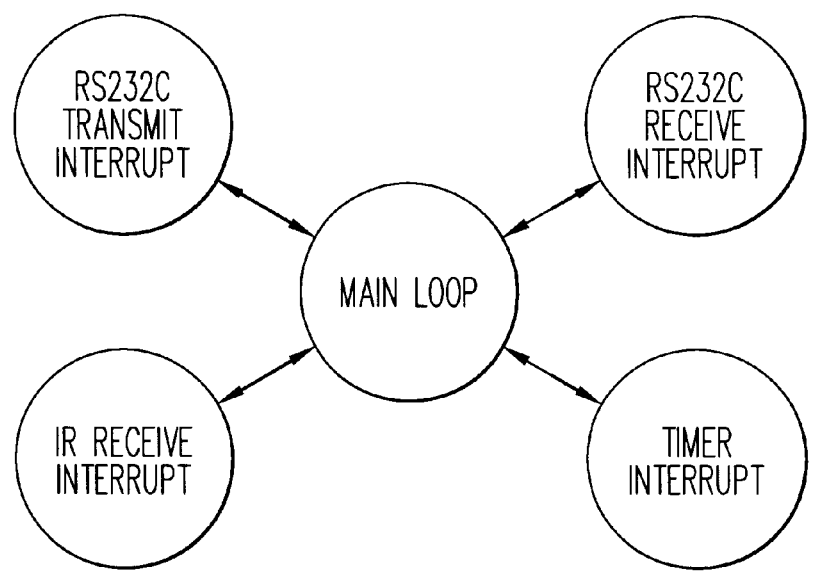
FIG. 4 shows the software flow of the receiver micro-controller.

FIG. 4 shows the software flow of the micro-controller used in the R. The main loops major function is decoding the IR signals into 32-bit digital data and putting the data in a transmission queue. There are also four interrupts connected to the loop. The timer interrupt provides a time counter of 0.1 ms resolution. The IR receive interrupt invokes the processor to decode. The RS232C receive interrupt puts the data received into the transmission queue, hence, enables a cascaded arrangement if more than one unit of R are used. The RS232C transmit interrupt sends out the data in the transmission queue. The overall dead time of the R is about 0.1 s.

In the preferred embodiment, the PC or PC notebook will need a minimum configuration of an i486 chip, 8M RAM, and Windows 3.1. The projector used to display the summarily results can be an LCD projector, a TV monitor (with a VGA-to-Video converter), or a screen projector.

Data logging, analysis and display are handled by the FON software. A FON session normally consists of several tasks such as answering multiple-choice questions in a class or in a product preference survey. The PC display monitor can be projected on a separate central display screen for all respondents to see. Each time a FON session is started, the PC monitor displays the physical layout of the Ts as boxes labelled by the last three digits of the corresponding IDs. Simultaneously, a data file is opened and labelled by the date plus start time. The default label could also be changed at this juncture.

Figure 5:
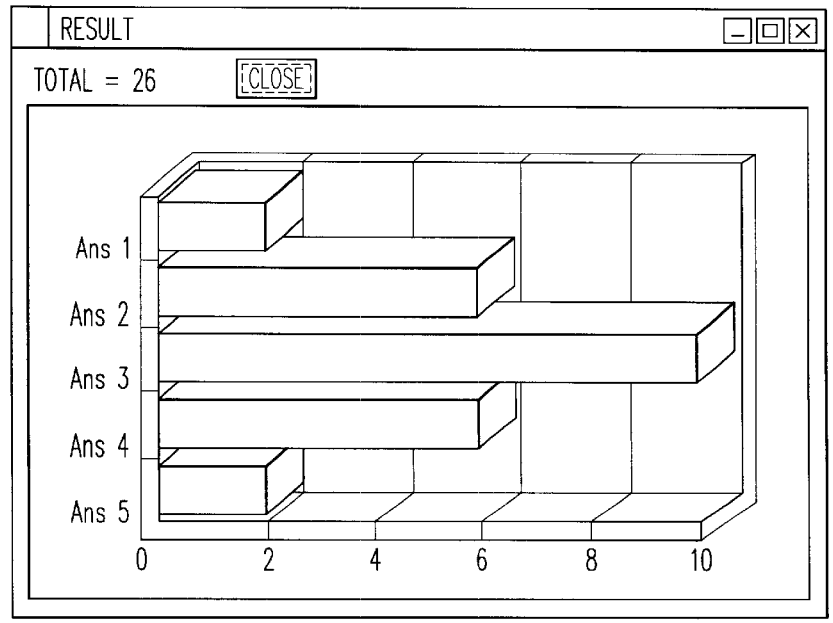
FIG. 5 shows a typical receiver screen display.

FIG. 5 shows a typical screen display. When a question is asked and the audience response is sought, the start button is pressed to begin the time counter. The question can be posed orally, using written handouts or with the aid of an audiovisual equipment. When a member of the audience answers by pressing a button on his or her T, the corresponding box on the central display screen changes colour for a second or two to acknowledge that the signal has been received. This T user can change his or her selection as many times as he or she wants within the allotted time for the question. If the T is equipped with its own display panel, each answer is shown on this panel plus the number of attempts an answer was sent out. The number of times an answer sent by each T was received during a particular question period is also indicated on the central display screen. The agreement between the number of times a message was sent and the number of times it was received provides an added measure of communication verification and means to alleviate traffic congestion.

The T signals, which have been received and digitized at the R, are stored in the order received in the data filed as a one-digit number tagged by the question number plus the ID number. After time counter reaches zero, the statistical distribution of the final answers of all the Ts is constructed and projected on the central display screen for the audience to see. Then the question number is incremented by one if there is a next task and the cycle is repeated. The results of any previous question in the same session can be retrieved for projection. At the conclusion of the session, an end-of-file is marked on the data file and this file is stored in data storage device like a hard disk of the PC for future recall. If, at the beginning of the session, the default Class mode is overridden in favour of the Poll mode, the ID part of each and every message will not be processed by the PC for that entire session.

In a situation where the network members are required to respond to a plurality of questions or stimuli nearly simultaneously like that on the stock exchange floor, a plurality of FON operating at a plurality of frequencies can be utilized with one FON at one frequency for one question or stimulus.

At least in its preferred forms the present invention does have potential limitations of short message length and low transmission rate if pile up or congestion effects are to be minimized. These limitations are the drawback of the systems simplicity. However, notwithstanding these limitations, the present invention is very well adapted to a number of important practical applications; eg members voting in a convention or a meeting of share holders, bidders making offers in an auction, an audience ranking their choices in a show or an exhibition, students responding to a question in a classroom or training session, and members signalling their bids on the floor of a stock exchange.

The last mentioned application would require a plurality of FONs operating at a plurality of distinct frequencies in the same location. A particularly advantageous embodiment of the present invention is in the context of an educational institution such as a school or university. Each and every one of the student body can have their own personal transmitter, with their individual ID number encoded in the unit, which they can bring to any of the classes they attend on campus. Another possibility is that the system could be useful where the student body or audience comprised people with a physical handicap. In this case the transmitters could be anchored in place and the button pressing accomplished using a pointer grasped by any part of the body a participant can use.

The invention has been described with respect to one preferred embodiment. This is done merely for the purpose of example. Many other variations, modifications and applications of the invention will be apparent to those skilled in the art. Hence, the invention should be considered to be limited only by the scope of the claims detailed below.

What is claimed is:

1. A free-forming one-way network, comprising:
    a plurality of wireless transmitters for the network participants, each said transmitter being adapted to transmit a short message, in the form of a short burst of coded radiation signals at a single or narrow-band frequency in free open air, in response to a prompt;
    a central unit having a wireless receiver for detecting the messages sent by the transmitters, said central unit being incapable of transmitting messages to the plurality of wireless transmitters;
    means for decoding and digitizing these messages;
    central processing means for receiving, storing and analyzing the decoded and digitized messages; and
    means for acknowledging to the sender the receipt of the message he or she sent.
2. A network as claimed in claim 1 wherein said wireless receiver comprises a plurality of individual receivers connected in cascade.
3. A network as claimed in claim 1 further comprising a central display screen and wherein said acknowledging means comprises means for showing each transmitter in symbolic form on said display screen and means for indicating receipt of a message by a change in said symbolic form.
4. A network as claimed in claim 3 wherein said change in said symbolic form comprises a colour change.
5. A network as claimed in claim 1 wherein each said transmitter comprises display means for displaying the message to be sent.
6. A network as claimed in claim 5 wherein said display means further comprises means for displaying the number of attempts made to send a said message.
7. A network as claimed in claim 1 wherein each said transmitter is provided with means for attaching an identification signal unique to a participant to a message to be transmitted.
8. A network as claimed in claim 7 wherein each said transmitter comprises a memory unit in which a said identification signal may be entered or changed only by means of a password.
9. A network as claimed in claim 7 wherein said central processing means includes means for removing said identification signals.
10. A network as claimed in claim 1 wherein said wireless receiver detects the short burst signals from a plurality of transmitters one signal at a time.
11. A network as claimed in claim 1 further comprising a central display screen.
12. A network as claimed in claim 11, wherein said central display screen is adapted to indicate the number of times a message was received from each of the plurality of transmitters within a preset time period.
13. A network as claimed in claim 1, wherein said network comprises a plurality of said network as sub-networks operating in parallel at a plurality of frequencies.
14. A network as claimed in claim 1 wherein said prompt is an action.
15. A network as claimed in claim 1 wherein said prompt is a question.
16. A network as claimed in claim 1 wherein said prompt is a stimulus.
17. A free forming one-way network for providing responses by a group of participants to a central location, comprising:
    a plurality of wireless transmitters, for use by respective participants to transmit a short message, in the form of a short burst of coded radiation signals at a single or narrow-band frequency in free open air, in response to a prompt;
    a wireless receiver at said central location for detecting the messages sent by the transmitters;
    a processor for storing and analyzing the detected messages; and
    a display device at said central location which is visible to said participants operable to display an acknowledgment of the receipt of the messages sent by each of the transmitters.
18. The network of claim 17, wherein the wireless receiver comprises a plurality of individual receivers connected in cascade.
19. The network of claim 18, wherein the individual receivers connected in cascade are connected in such a manner that an arc of coverage, within which the receivers connected in cascade are operative to receive transmissions from the wireless transmitters, is larger than coverage of any individual receiver.

20. The network of claim 17, wherein the display device is configured to display each transmitter in symbolic form, and indicate receipt of a message from each transmitter by a change in the symbolic form of the corresponding transmitter on the display device.

21. The network of claim 20, wherein the change in the symbolic form comprises a color change.

22. The network of claim 17, wherein each transmitter comprises a local display device for displaying the message to be sent.

23. The network of claim 22, wherein the local display device is further operative to display the number of attempts made to send the message.

24. The network of claim 17, wherein each transmitter is operative to attach an identification signal to a message to be transmitted, the identification signal being unique to a participant.

25. The network of claim 17, wherein the wireless receiver detects the short burst signals from a plurality of transmitters one signal at a time.

26. The network of claim 17, wherein the display device is adapted to indicate the number of times a message was received from each of the plurality of transmitters within a preset time period.

27. The network of claim 17, wherein the network is a plurality of sub-networks operating in parallel at a plurality of frequencies, each sub-network comprising all of the features of the network of claim 17.

28. A method for prompting and responding using a plurality of remote, wireless transmitters, comprising the steps of:

prompting a group of participants for a response;

receiving a plurality of responses at a central location from the participants via remote wireless transmitters;

detecting each response received individually;

storing and analyzing the received and detected responses individually; and acknowledging the receipt of the response to a participant who sent the response by displaying an acknowledgement at said central location which is visible to the participant who sent the response.

29. The method of claim 28, wherein the step of detecting each response received individually further comprises receiving an identification signal unique to each participant.

30. The method of claim 29, wherein the step of storing and analyzing the received and detected responses further comprises removing the identification signal.

* * * * *